No. 740,714. PATENTED OCT. 6, 1903.
J. & W. TITUS.
APPARATUS FOR THE MEDICATION OF AIR.
APPLICATION FILED AUG. 20, 1902.
NO MODEL.
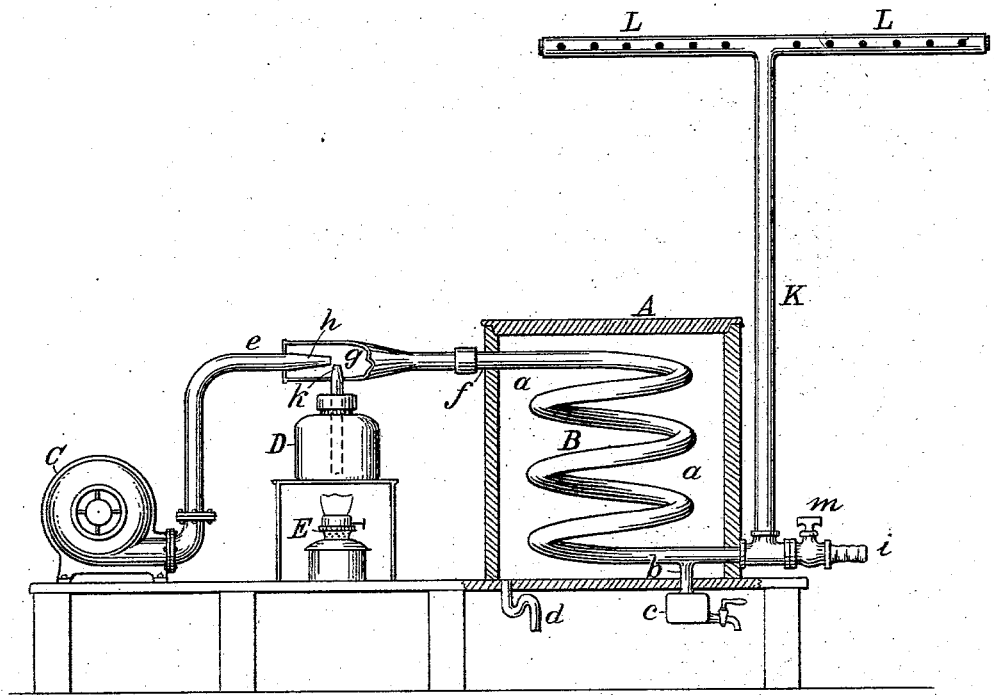
WITNESSES:
Geo. W. Kittredge
Daniel S. Dite
INVENTORS
John Titus
William Titus
BY
James A. Whitney
ATTORNEY No. 740,714. Patented October 6, 1903.

UNITED STATES PATENT OFFICE.

JOHN TITUS, OF OYSTER BAY, AND WILLIAM TITUS, OF OLD WESTBURY, NEW YORK.

APPARATUS FOR THE MEDICATION OF AIR.

SPECIFICATION forming part of Letters Patent No. 740,714, dated October 6, 1903.

Application filed August 20, 1902. Serial No. 120,295. (No model.)

*To all whom it may concern:*

Be it known that we, JOHN TITUS, residing at Oyster Bay, and WILLIAM TITUS, residing at Old Westbury, in the town of North Hempstead, in the county of Nassau and State of New York, citizens of the United States, have jointly invented certain new and useful Improvements in the Medication of Air; and we do hereby declare that the following is a full, clear, and exact description of the same, reference being had to the accompanying drawing, making a part of this specification, which is a vertical sectional view of an apparatus included in our said invention.

The object of this invention is to provide for the effective and economical charging of atmospheric air with medicinal or other substances in proportions the most suitable for curative, hygienic, or sanitary purposes, and to cool and dry air thus charged in order to eliminate aqueous vapor therefrom, and also to remove therefrom any condensed excess of the charging material. This object we attain by the instrumentalities hereinafter fully shown and described.

A is a refrigerating apparatus which may be economically constructed of a coil B, of pipe, placed in a suitable box or chest $a$. This latter when duly supplied with ice, ice and salt, or other suitable refrigerating substance or mixture in contact with the coil reduces the temperature of any fluid passed through the coil. As shown in the drawing, the coil should be so provided that moisture condensing therein will flow downward to be discharged at the lower part of the coil. An outlet for the water of condensation separate from the outlet for air from the coil is provided, as shown at $b$, and in appropriate relation therewith a receptacle $c$. Water which would otherwise accumulate in the chest $a$ outside of the coil may be permitted to drain off through a gooseneck outlet $d$ at the bottom of the chest.

To propel through the coil the moving volume of air to be medicated and cooled, there is provided an air-forcing apparatus, which, as shown in the drawing, may consist of a fan-blower C, which may be operated from any suitable source of power. Interposed between the outlet $e$ of the blower and the adjacent inlet $f$ of the air-transmitting pipe or coil B of the refrigerating apparatus is a chamber $g$, in which the medicating fluid is mingled with the air prior to the passage of the latter to the refrigerating apparatus. Inserted in the outlet $e$ is an ejector-nozzle $h$, which projects into the chamber $g$ and which is so arranged in relation with a spray-nozzle $k$ that the air-blast from the ejector-nozzle, sweeping across the end of the spray-nozzle, draws the liquid from the latter and carries it forward from the chamber to the coil, thereby spraying the liquid into intimate mixture with the air and charging the latter with the liquid drawn from the spray-nozzle, as described. The spray-nozzle is supplied with the liquid from a vessel or reservoir D, with which it is properly connected. To provide for cases wherein the air is to be charged with material that in its normal condition at ordinary temperature is not sufficiently fluid to pass readily through the spray-nozzle, the reservoir D is provided with a kerosene or other burner E, or other source of heat, whereby it may be duly liquefied or, if desired, vaporized prior to its admission to the chamber $g$ or passage to the coil. When the medicated and cooled air is desired to be diffused in the atmosphere, as, for example, of a room, it may be permitted to make its exit direct from the outer end $i$ of the coil, or it may be transmitted to and through a pipe or tube attached to said outer end to any desired locality. To provide for the equable distribution of the air from the coil to localities more or less remote, a vertical trunk K is provided to the outlet end of the coil, this trunk having one or more horizontal perforated branches L, through and from which the air from the coil is discharged. In the use of this trunk K the outlet end $i$ of the coil should be closed, so as to direct the air-volume into the trunk. This may be conveniently done by means of a valve $m$ at said outlet $i$ of the coil.

The operation of the apparatus is as follows: Atmospheric air, which ordinarily is charged more or less with aqueous vapor and with impurities held in suspension by such vapor, is forced by the blower through the ejector-nozzle and across the mouth of the spray-nozzle, thereby, as explained, drawing the liquid through the spray-nozzle from the reservoir and commingling it intimately into the air. This charging of the air with the medicating or other fluid is frequently in excess of what is desired for the proper medication or tempering of the air. After being charged with the medicative material, as described, the air is forced into and through the coil. This latter, from its low temperature derived from the refrigerating material around it, condenses the moisture from the air, the products of condensation carrying down with them the impurities previously held in suspension in the air and also any excess of the medicative or charging material in the air over and above that which is normally absorbable by the air at the low temperature reached by the latter in passing through the refrigerating-coil. The air thus freed from undue moisture and impurities and holding in diffusion therethrough that proportion of the medicated material which under the given conditions it is normally capable of absorbing and retaining may be employed for sanitary, hygienic, or curative purposes. The medicative material may be of any desired kind or character, so long as it is sufficiently fluid to be carried through the apparatus as described.

What we claim as our invention is—

1. The combination with a refrigerator and mechanism for forcing a volume of air therethrough, of an ejector-nozzle in the outlet of said mechanism, and a spray-nozzle arranged in due relation with the ejector-nozzle to supply medicative fluid to the action of the ejector-nozzle to mingle the fluid with the air prior to its passage through the refrigerator, as described.

2. The combination with a chest for holding refrigerating material and coiled air-transmitting pipe in said chest, and a blower for forcing air to and through the coil, of a chamber interposed between the outlet of the blower and the inlet of the coil, an ejector-nozzle at the outlet of the blower and extended into the chamber, a spray-nozzle extended into the chamber and arranged to operate in conjunction with the ejector-nozzle, and a reservoir for supplying fluid material to the spray-nozzle, as described.

3. The combination with a chest for holding refrigerating material, a coiled air-transmitting pipe in said chest, and a blower for forcing air to and through the coil, of a chamber interposed between the outlet of the blower and the inlet of the coil, an ejector-nozzle at the outlet of the blower and extended into the chamber, a spray-nozzle extended into the chamber and arranged to operate in conjunction with the ejector-nozzle, a reservoir for supplying fluid material to the spray-nozzle and a vessel communicating with the outlet end of the coil by a passage distinct from the air-outlet of the coil for removing the liquid products of condensation from the coil, as described.

4. The combination with a refrigerator and means for forcing a volume of air therethrough, an ejector-nozzle in the outlet of the air-forcing mechanism and a spray-nozzle arranged in due relation with the ejector-nozzle to supply medicated fluid to the action of the ejector-nozzle to mingle the fluid with the air prior to its passage through the refrigerator, of means for heating the material from which the fluid is derived, as set forth.

5. The combination with a chest for holding refrigerating material, a coiled air-transmitting pipe in said chest, and a blower for forcing a volume of air to and through the coil, of a chamber interposed between the outlet of the blower and the inlet of the coil, an ejector-nozzle at the outlet of the blower and extended into the chamber, a spray-nozzle extended into the chamber and arranged to operate in conjunction with the ejector-nozzle, and a reservoir for supplying fluid material to the spray-nozzle, of a vertical trunk having one or more distributing-pipes for distributing the air indicated through the action of the nozzles, as described.

JOHN TITUS.
WILLIAM TITUS.

Witnesses:
JAMES A. WHITNEY,
AMAZIAH WHITNEY.